United States Patent [19]

Marscher

[11] 4,109,031

[45] Aug. 22, 1978

[54] STRESS RELIEF OF METAL-CERAMIC GAS TURBINE SEALS

[75] Inventor: William D. Marscher, Coventry, Conn.

[73] Assignee: United Technologies Corporation, Hartford, Conn.

[21] Appl. No.: 754,669

[22] Filed: Dec. 27, 1976

[51] Int. Cl.² .............................. B22F 5/00; B22F 7/00
[52] U.S. Cl. .................................... 427/191; 228/122; 432/10; 432/18; 428/336; 428/457; 428/472
[58] Field of Search .................. 428/336, 472, 457; 29/182.5, 182.2, DIG. 24; 148/27, 126; 427/191, 193, 374, 380, 383, 398, 404, 405, 419

[56] References Cited

U.S. PATENT DOCUMENTS

| | | | |
|---|---|---|---|
| 3,091,548 | 5/1963 | Dillon | 428/336 |
| 3,975,165 | 8/1976 | Elbert | 428/472 |

*Primary Examiner*—Marion E. McCamish
*Attorney, Agent, or Firm*—Charles E Sohl

[57] ABSTRACT

A process for the production of ceramic-metal assemblies which are joined by a graded layer of a metal-ceramic mixture is described. The effect of the processing sequence is to vary the prestress between the metal and ceramic components. The assemblies are produced by heating at elevated temperatures and the process of the invention involves preferential cooling of the metal portion of the assembly.

4 Claims, 5 Drawing Figures

STRESS RELIEF OF METAL-CERAMIC GAS TURBINE SEALS

BACKGROUND OF THE INVENTION

1. Field of the Invention

This invention relates to the fabrication of metal-ceramic articles of the type which are bonded together by an intermediate layer of mixed metal and ceramic.

2. Description of the Prior Art

The prior art has recognized that the stresses which arise from the difference in the coefficients of thermal expansion pose a major problem in the production of bonded metal-ceramic articles. This problem is discussed in the Ceramic Bulletin, Vol. 38, No. 6, 1959, pp. 301–307 and in the book Vacuum Sealing Techniques by A. Roth, published by Pergamon Press. One prior art solution involves the use of a graded layer between the metal and ceramic components with the intermediate layer being a mixture of metal and ceramic. The intermediate layer may be a graded layer in which the relative amounts of metal and ceramic vary from 100% metal at the metal interface to 100% ceramic at the ceramic interface. By the use of such a layer, the stresses caused by differential thermal expansion are distributed throughout a volume of material. The use of graded metal-ceramic seals made by powder techniques is described in Ceramic Age, February 1954, pp. 12–13. U.S. Pat. No. 3,091,548 describes a high temperature ceramic coating which is bonded to a metallic article with several intermediate layers of mixed ceramic-metal compositions.

SUMMARY OF THE INVENTION

A process which utilizes differential cooling for the production of metal-ceramic composite articles is described. The articles have a mixed metal-ceramic interlayer between the metal and ceramic components and this interlayer has a characteristic softening temperature at which the interlayer material becomes plastic and deforms freely upon the application of load. Differential cooling is applied to the metal component to cool it quickly below the softening temperature of the intermediate layer while the intermediate layer is above its softening temperature and while the ceramic component is above the softening temperature of the intermediate layer. After the preferential cooling of the metal component the article is allowed to cool at a uniform rate. The effect of the preferential cooling step is to cause the metal component to contract while the intermediate layer is still in a plastic condition and the ceramic component is at an elevated temperature. Upon subsequent cooling, the intermediate layer abruptly regains most of its strength but, due to the nonuniform temperature gradient remaining from the preferential cooling, the residual stress is different than that which would result from that obtained by the conventional uniform cooling which has previously been employed.

The foregoing and other objects, features and advantages of the present invention will become more apparent in the light of the following detailed description of preferred embodiments thereof as discussed and illustrated in the accompanying drawing.

DESCRIPTON OF THE PREFERRED EMBODIMENT

This invention was developed for use in the production of air seals for gas turbine engines. However, the invention may have utility in connection with the production of various other composite articles of bonded metal-ceramic structure. The invention will be described with reference to the specific application to gas turbine seals.

Figure 1:
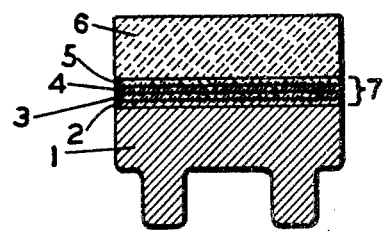
FIG. 1 shows a schematic cutaway of a metal-ceramic seal.

FIG. 1 shows a schematic cross section of a gas turbine air seal. The air seal consists of a metal backing plate 1 and a ceramic seal component 6 separated by interlayer 7 of mixed metal-ceramic. The backing plate 1 is attached to the turbine engine case while the inner ceramic component is in close proximity to the rotating blades. The function of the seal is to minimize gas leakage around the blades. In a specific embodiment, the backup layer may be a cobalt superalloy such as MAR-M509 and the ceramic component may be based on zirconia. The interlayer may be comprised of several layers 2, 3, 4 and 5 which may have different compositions, for example, if the interlayer 7 is comprised of four layers as shown in FIG. 1, layer 5 might be 80% ceramic, 20% metal, layer 4 might be 60% ceramic, 40% metal, layer 3 might be 40% ceramic, 60% metal, and layer 2 might be 20% ceramic, 80% metal. Of course other combinations of metal and ceramic layers, including more or fewer layers, or a continuously graded arrangement might be used. While seals have been made using MAR-M509 and zirconia, other materials could of course be substituted. MAR-M509 is a cobalt base superalloy which has a nominal composition of 0.6% C, 24% Cr, 10% Ni, 7% W, 7.5% Ta, 0.2% Ti, 1% Fe, balance essentially cobalt. Other nickel and cobalt base superalloys could be substituted for the MAR-M509. Likewise, other ceramics such as alumina might be substituted for the zirconia. These ceramics may be modified, as for example, additions may be made to zirconia to stabilize the crystal structure. The metal powder in the intermediate layer need not be of the same composition as the backup layer. Of course, if other materials are substituted, their mechanical and thermal properties must be taken into consideration.

Figure 2:
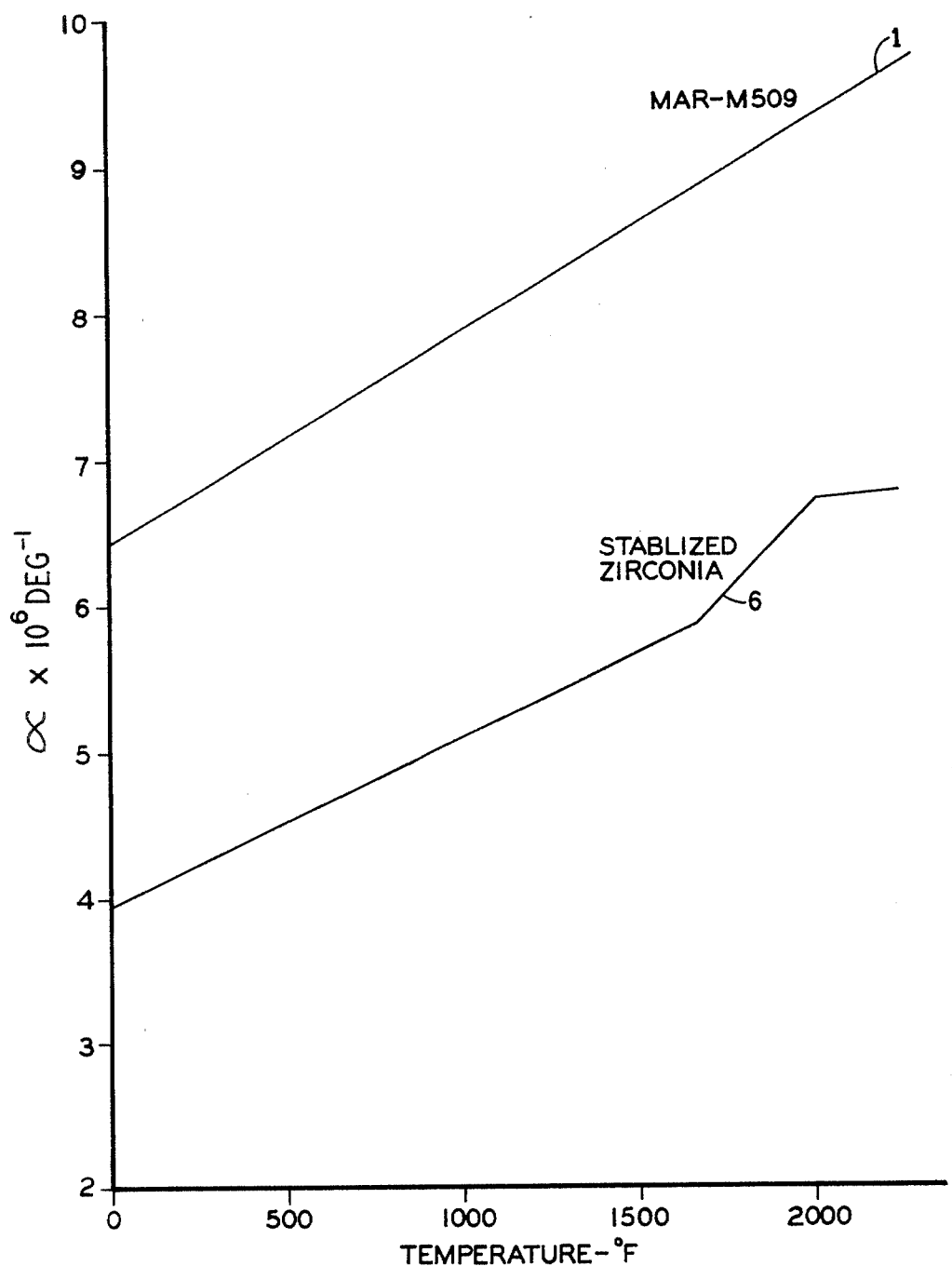
FIG. 2 shows the coefficient of expansion of a typical superalloy, MAR-M509 and a ceramic, zirconia, as a function of temperature.
Figure 3:
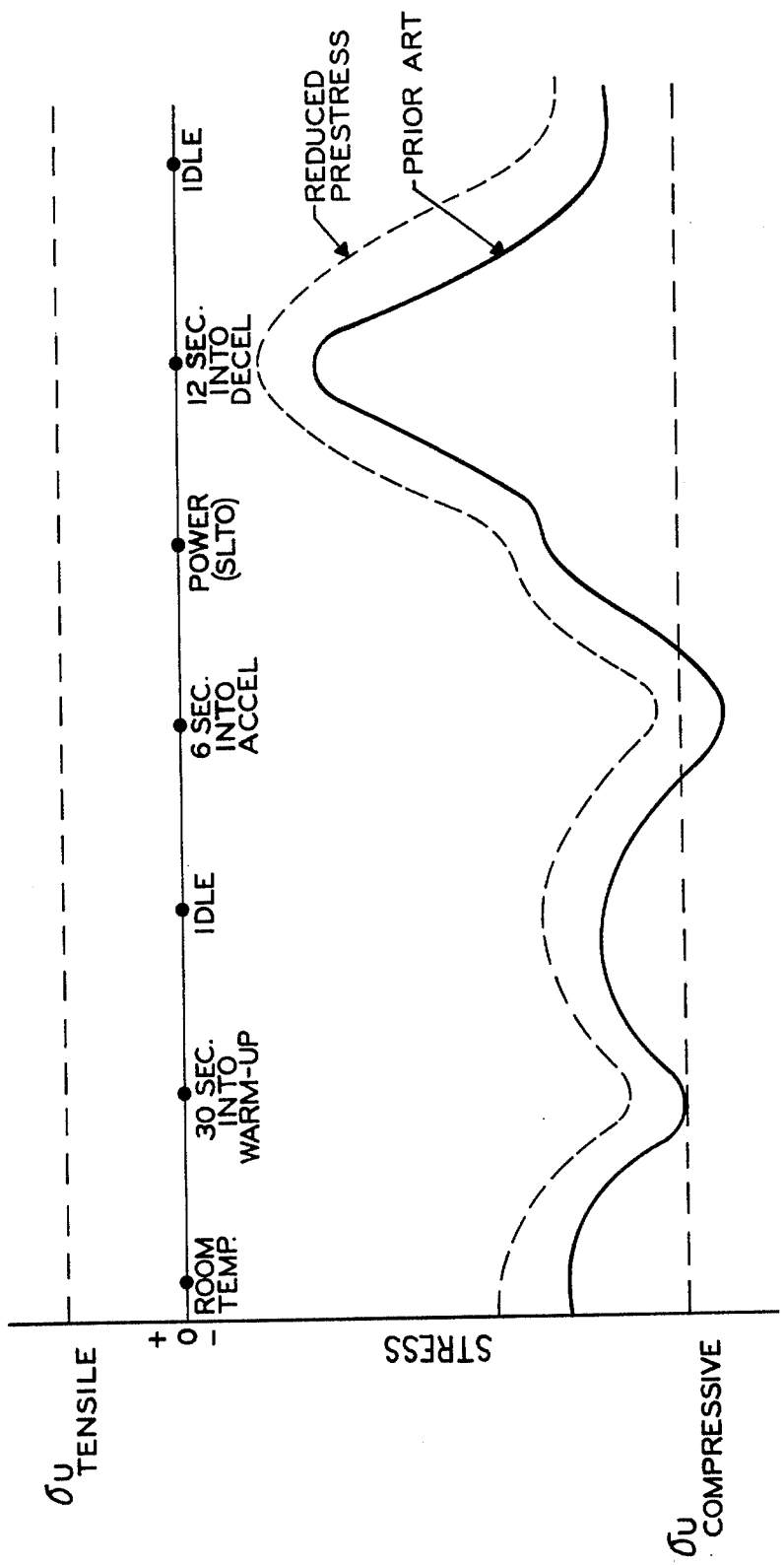
FIG. 3 shows the stresses which might arise in a typical gas turbine seal during various parts of an engine cycle.

Metals and ceramics have different coefficients of thermal expansion and representative curves which show the coefficient of thermal expansion of MAR-M509 and zirconia are shown in FIG. 2. The expansion properties of the mixed metal-ceramic layers would generally lie between the two curves in FIG. 2. It can be seen that the coefficient of thermal expansion of the metal component is much greater than that of the ceramic component and this is true for virtually all combinations of metals and ceramics. The differences in coefficient of expansion result in stresses in a composite article as shown in FIG. 1 when the article is heated. In the gas turbine environment, the ceramic component may be exposed to a gas stream whose temperature may be as high as 2600° F. At the same time, since the metal backup material becomes weak at such elevated temperatures, and may even melt, it is cooled with air on the back surface. The result of these temperature differences to which the seal is exposed in service are thermal stresses which can cause cracking of the ceramic component. This problem is further complicated by the fact that the stresses vary as the engine goes through various types of service. This is illustrated in schematic form in FIG. 3 in which the stresses, in the ceramic portion of the previously described seal, encountered during aircraft gas turbine engine operation are shown. Since it is very difficult to measure such stresses in actual operation, the data on which this curve is based are the result of computer simulation which takes into account material properties and (measured) temperatures. Actual engine tests have verified this computer model. The stress shown on the abscissa of the figure is that which is observed in the ceramic component and the compressive yield stress is shown to be about eight times that of the tensile yield stress and this is typical for ceramics. The variations in the ceramic stress level shown in the figure are largely the result of differences in temperature during different parts of the engine cycle. For this reason, FIG. 3 is merely a schematic since both the tensile and compressive yield stresses will vary somewhat with temperature. Assuming, however, that the tensile and compressive yield stresses are those shown in FIG. 3, it can be seen that the stress in the ceramic component exceeds the compressive yield stress for at least part of the cycle and therefore failure of the ceramic component will occur. Consideration of the figure indicates that if the entire curve could be shifted in the tensile direction, this problem could be eliminated without encountering problems from excessive tensile loads.

Figure 4:
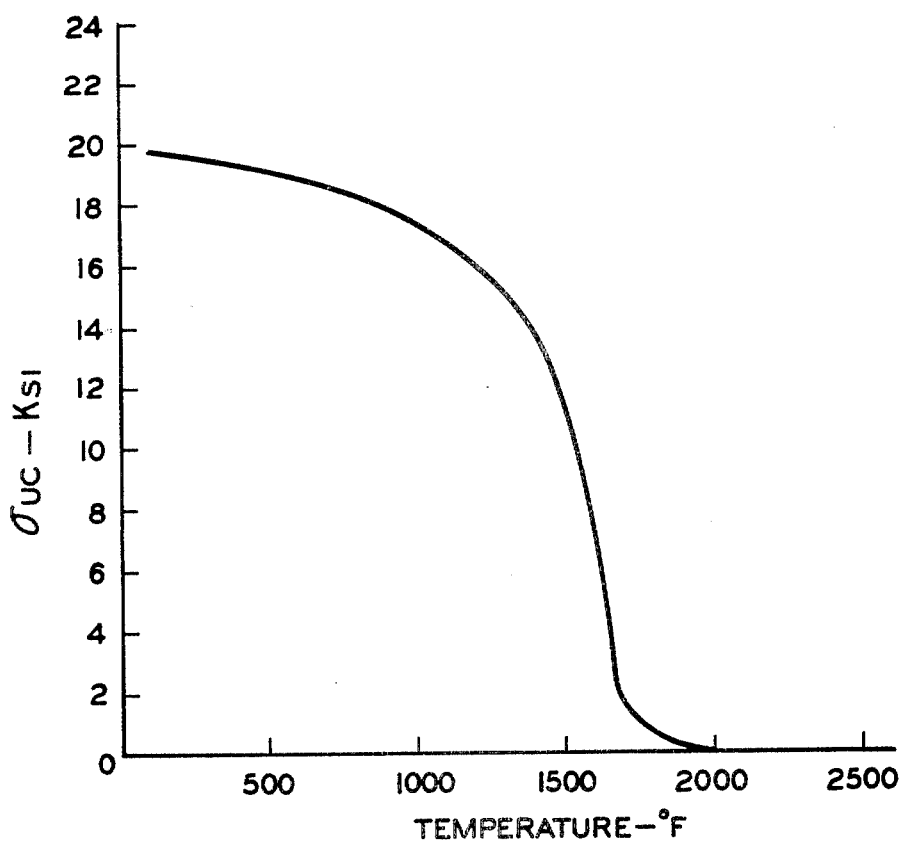
FIG. 4 shows the ultimate compressive strength of a typical mixed metal-ceramic intermediate layer as a function of temperature.

The process of the invention changes the level of prestress in the composite article thereby effectively shifting the curve in FIG. 3 upwardly. The dotted curve in FIG. 3 reflects a decreased prestress level. Prestress is present in the composite article as a result of the properties of the components and the nature of the process used to produce the components. One method of producing the article is by hotpressing metal and ceramic powders in a die. In referring to FIG. 1, layers of powder representing layers 2, 3, 4, and 5 and the ceramic component 6 would be hotpressed in the die (at perhaps 2350° F) and the resultant compact would be bonded to the metal backup layer, for example, by a brazing process. The mechanical properties of the mixed metal-ceramic intermediate layer are strongly temperature-depending and this is illustrated in FIG. 4 which shows the yield stress of a mixture of a nickel-chrome alloy, and zirconia, typical of that which might be used in a seal, as a function of temperature. It can be seen that the yield strength drops abruptly at a temperature of about 1600° F. A specific softening temperature might be defined as that temperature at which the metal ceramic had lost 50% of its room temperature strength. The powder compact is bonded to the metal backup layer at a temperature of about 2150° F which is well above 1600° F. Since the yield strength of the intermediate layer is very low above 1600° F, the stress between the metal and ceramic components at temperatures above 1600° F will be negligible. The 160° F temperature can be considered to be the stress free temperature, that temperature at which no stresses are present in the seal (assuming a uniform 1600° F throughout the seal). However, upon cooling below 1600° F, the intermediate layer will become strong enough to support a stress and the stress level in the ceramic will increase as a result of the difference of the coefficients of thermal expansion between the metal and ceramic components. For a particular combination of metal and ceramic components, joined by an intermediate layer having a particular softening temperature, the stress free temperature at any location in the structure at any temperature below the softening temperature will be a constant which can be determined from the relative coefficients of thermal expansion.

The method of the invention is not limited to articles made by powder techniques. Articles made by other processes such as plasma spray deposition, may be given the thermal treatment of the invention.

In the operation of the gas turbine engine, the seals are constrained to operate under conditions such that the intermediate layer is always below its softening temperature, despite the face that the surface of the ceramic component may be in excess of 2000° F. Sufficient cooling air is applied to the metal backup component to maintain the intermediate layer at a temperature below its softening point. Consequently, there is always a degree of prestress in conventionally produced metal-ceramic seals during operation. This prestress in the ceramic will be compressive since the metal will contract more than ceramic as the temperature of the seal drops below 1600° F. This degree of compressive stress is shown schematically in FIG. 3 (in the portion of the curve labeled Room Temp.).

The process of this invention involves differential cooling so that the degree of prestress in the seal can be modified to be other than that which would be found under an equilibrium situation. In particular, by preferentially cooling the metal backup element while maintaining the intermediate layer and the ceramic component at an elevated temperature and then allowing the complete seal to cool uniformly, the compressive prestress in the ceramic portion of the seal may be reduced. This is shown in FIG. 1 by the shifted curve (dotted line). Another way to consider the process is to say that the stress free temperature has been reduced. The reduction of stress free temperature is a consequence of the preferential cooling since the intermediate layer still becomes hard at the same temperature.

In summary, the process of the invention involves heating the complete seal assembly to a temperature above the softening temperature of the intermediate layer and preferentially cooling the metal component while maintaining the ceramic and the intermediate layer at an elevated temperature with the temperature of the intermediate layer staying above its softening point. After the preferential cooling step, the whole seal assembly is then allowed to cool substantially uniformly, as, for example, by convective cooling in a gaseous environment. For example, the preferential cooling step may be applied by an air jet or equivalent cooling jet of another gas or heat transfer media.

In seals fabricated by prior art techniques (uniform cooling) the stress free temperature will be that temperature at which the intermediate layer first achieves significant strength during cooling. This temperature might more accurately be called the uniform stress free temperature since the achievement of the stress free condition requires essentially a uniform temperature throughout the article. The process of the invention employs preferential cooling so that the stress free condition is most accurately described in terms of the average metal temperature and average ceramic temperature at the temperature where the intermediate layer first achieves significant strength. For example, in a metal-ceramic composite with an intermediate layer whose softening temperature was 1600° F the uniform stress free temperature would be 1600° F if uniform cooling was employed. If however the preferential cooling of the present invention were applied so that the average metal temperature was 1200° F and the average ceramic temperature 1600° F when the interlayer temperature were 1600° F the composite article would have two stress free temperature conditions. The first condition would be a condition where the average metal temperature was 1200° F and the average ceramic temperature was 1600° F (this corresponds to the fabrication conditions) the second stress free condition would be a uniform temperature of about 800° F and this is a consequence of the fact that the coefficient of expansion of the ceramic is about one half the coefficient of expansion of the metal. Thus the ceramic and metal components would contract an equal amount if they were cooled from the previously mentioned 1600°/1200° F temperature condition to a uniform temperature of 800° F and a stress free condition would result.

Figure 5:
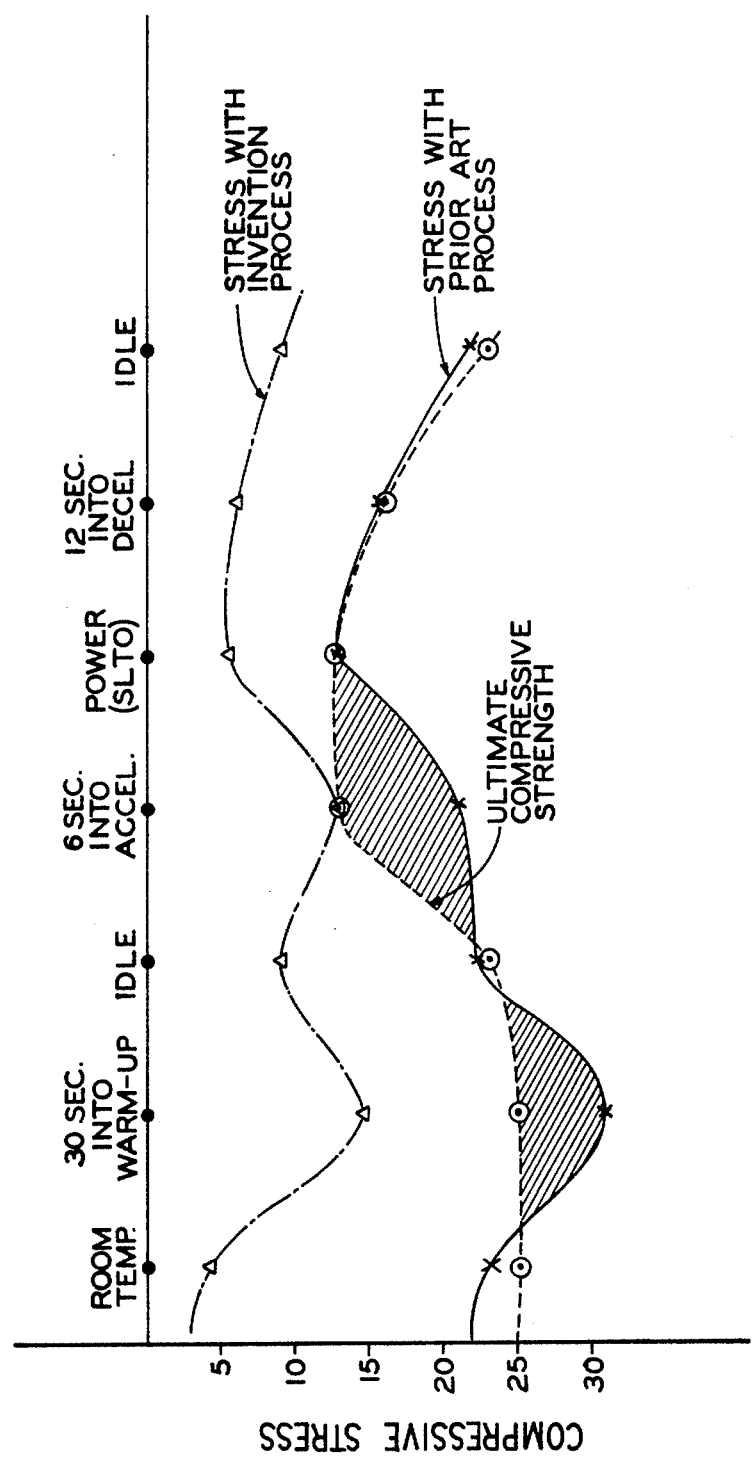
FIG. 5 shows actual computed stresses in a gas turbine seal.

The following description of a model seal situation may aid in understanding the invention. With reference to FIG. 1, the metal backing plate has a stiffness which is equal to that which would be produced by a uniform metal thickness of 0.2 inch. The metal of the backing plate is MAR-M509. The intermediate layer has a thickness of about 0.1 inch and is composed of several graded layers which are a mixture of a nickel-chromium alloy and stabilized zirconia. The outer ceramic layer has a thickness of about 0.1 inch and is composed essentially of stabilized zirconia. This model seal is patterned on one developed for use in the P&WA JT9D turbine engine. This model seal assembly has been analyzed in terms of the conditions which it would encounter in use in a commercial gas turbine engine (JT9D). The particular points where the stresses were evaluated are identical to those shown in FIG. 3 (SLTO refers to seal level take-off). The results are shown in FIG. 5. In FIG. 5, the dotted curve shows the ultimate compressive strength of the ceramic under the various engine cycle conditions. The solid curve shows the stress levels which would be present in the ceramic layer of the model system under the various engine cycle conditions. The values shown by the solid curve were computed for the prior art fabrication technique involving uniform cooling and a resultant uniform stress free temperature of about 1600° F. Comparing the dotted curve with the solid curve, it can be seen that the stresses on the ceramic exceed the strength of the ceramic for the conditions. The cross-hatched regions indicate areas of engine operation where seal failure is likely. The final curve (dot-dash) shows the stresses which would be present in the ceramic layer if the ceramic layer were processed according to the present invention under preferential cooling conditions such that the average metal temperature were 1235° F and the average ceramic temperature were 1600° F at the time that the intermediate layer became strong. As indicated previously, the accuracy of this model has been verified by engine tests. It can be seen that the stresses do not exceed the strength of the ceramic layer under any of the listed engine conditions. This curve illustrates the effect of the preferential cooling treatment.

Although this invention has been shown and described with respect to a preferred embodiment thereof, it should be understood by those skilled in the art that various changes and omissions in the form and detail thereof may be made therein without departing from the spirit and scope of the invention.

Having thus described a typical embodiment of my invention, that which I claim as new and desire to secure by Letters Patent of the United States is:

1. A process for modifying the magnitude of the thermal stresses between the metal and ceramic components of a bonded article having an interlayer of mixed metal-ceramic composition between the metal and ceramic components with the interlayer having a characteristic softening temperature, which comprises:
   (a) providing an article consisting of a metal component and a ceramic component separated by an interlayer of mixed metal-ceramic composition;
   (b) heating the article to a temperature in excess of the softening point of the intermediate layer;
   (c) preferentially cooling the metal component to a temperature below the softening temperature of the intermediate layer while the ceramic component and intermediate layer remain at a temperature above the softening point of the intermediate layer; and
   (d) allowing the article to cool at a substantially uniform rate until the entire article is below the softening point of the intermediate layer.

2. A process as in claim 1 wherein the preferential cooling step is performed using a gas jet.

3. A process as in claim 1 wherein the metal component is a superalloy.

4. A process as in claim 1 wherein the ceramic component is composed predominately of zirconia.

* * * * *